United States Patent
Catovic et al.

(10) Patent No.: US 11,785,543 B2
(45) Date of Patent: Oct. 10, 2023

(54) METHODS AND APPARATUS TO FACILITATE SLEEP MECHANISMS FOR READ-ONLY MODE DEVICES IN A DEDICATED CARRIER

(71) Applicant: QUALCOMM Incorporated, San Diego, CA (US)

(72) Inventors: Amer Catovic, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 173 days.

(21) Appl. No.: 16/919,038

(22) Filed: Jul. 1, 2020

(65) Prior Publication Data
US 2021/0007049 A1    Jan. 7, 2021

Related U.S. Application Data

(60) Provisional application No. 62/870,502, filed on Jul. 3, 2019.

(51) Int. Cl.
*H04W 52/02*   (2009.01)
*H04W 4/06*   (2009.01)
(Continued)

(52) U.S. Cl.
CPC ......... *H04W 52/0229* (2013.01); *H04W 4/06* (2013.01); *H04W 52/0216* (2013.01);
(Continued)

(58) Field of Classification Search
None
See application file for complete search history.

(56) References Cited

U.S. PATENT DOCUMENTS

2012/0026929 A1   2/2012  Wang et al.
2014/0348055 A1*  11/2014  Hoymann .......... H04B 7/15557
                                                        370/315
(Continued)

FOREIGN PATENT DOCUMENTS

WO    2018034475 A1    2/2018

OTHER PUBLICATIONS

International Search Report and Written Opinion—PCT/US2020/040771—ISA/EPO—dated Oct. 14, 2020.

*Primary Examiner* — Jutai Kao
(74) *Attorney, Agent, or Firm* — Arent Fox, LLP

(57) ABSTRACT

Apparatus, methods, and computer-readable media for facilitating sleep mechanisms for read-only mode devices in a dedicated carrier are disclosed herein. An example method for wireless communication at a UE includes triggering a transition to an active mode, from a sleep mode, based on an occurrence of an active mode transitioning trigger event. In some examples, the active mode transitioning trigger event includes at least one of a system information transmission occasion, a control information transmission occasion, or a user data transmission occasion. The example method also includes transitioning to the active mode, from the sleep mode, based on the occurrence of the active mode transitioning trigger event. In some examples, the occurrence of the system information transmission occasion or the control information transmission occasion may occur during a CAS region of a broadcast transmission, and the occurrence of the user data transmission occasion may occur during the broadcast transmission.

33 Claims, 9 Drawing Sheets

(51) Int. Cl.
*H04W 74/08* (2009.01)
*H04W 72/30* (2023.01)

(52) U.S. Cl.
CPC ... *H04W 52/0235* (2013.01); *H04W 52/0274* (2013.01); *H04W 72/30* (2023.01); *H04W 74/0808* (2013.01)

(56) References Cited

U.S. PATENT DOCUMENTS

| | | | |
|---|---|---|---|
| 2018/0110072 A1* | 4/2018 | Sabapathi | H04W 68/12 |
| 2020/0045631 A1* | 2/2020 | Vyas | H04L 5/0048 |
| 2020/0163017 A1* | 5/2020 | Priyanto | H04W 52/0229 |
| 2020/0304968 A1* | 9/2020 | Lee | H04W 4/40 |

* cited by examiner

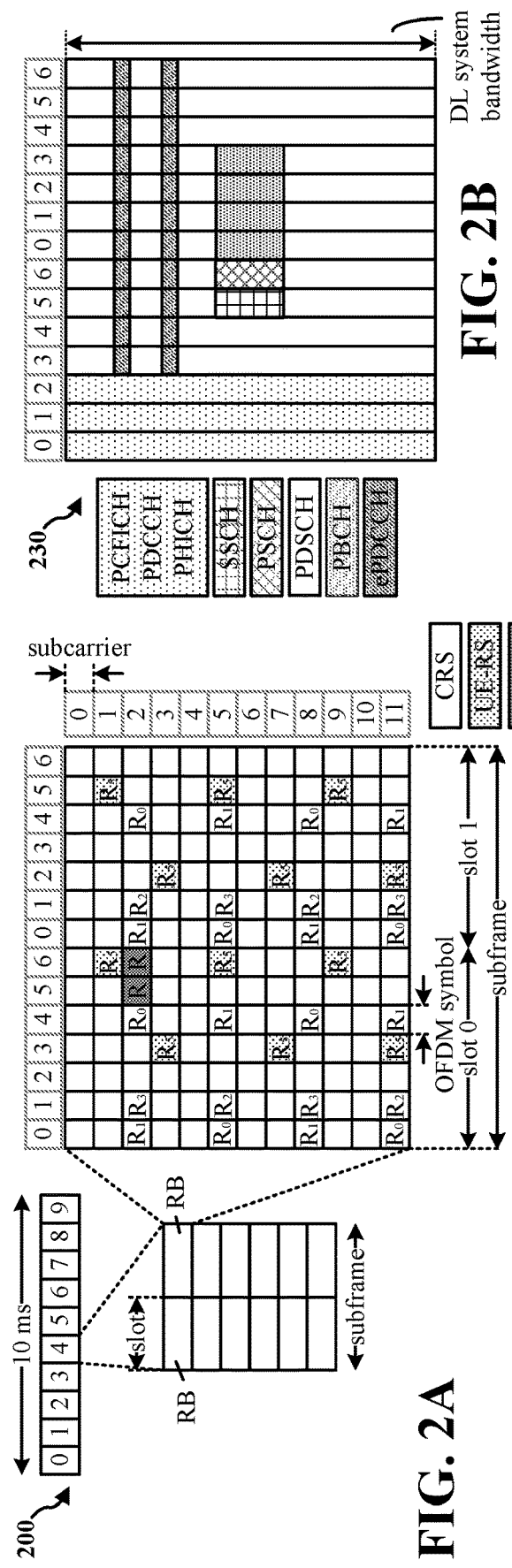
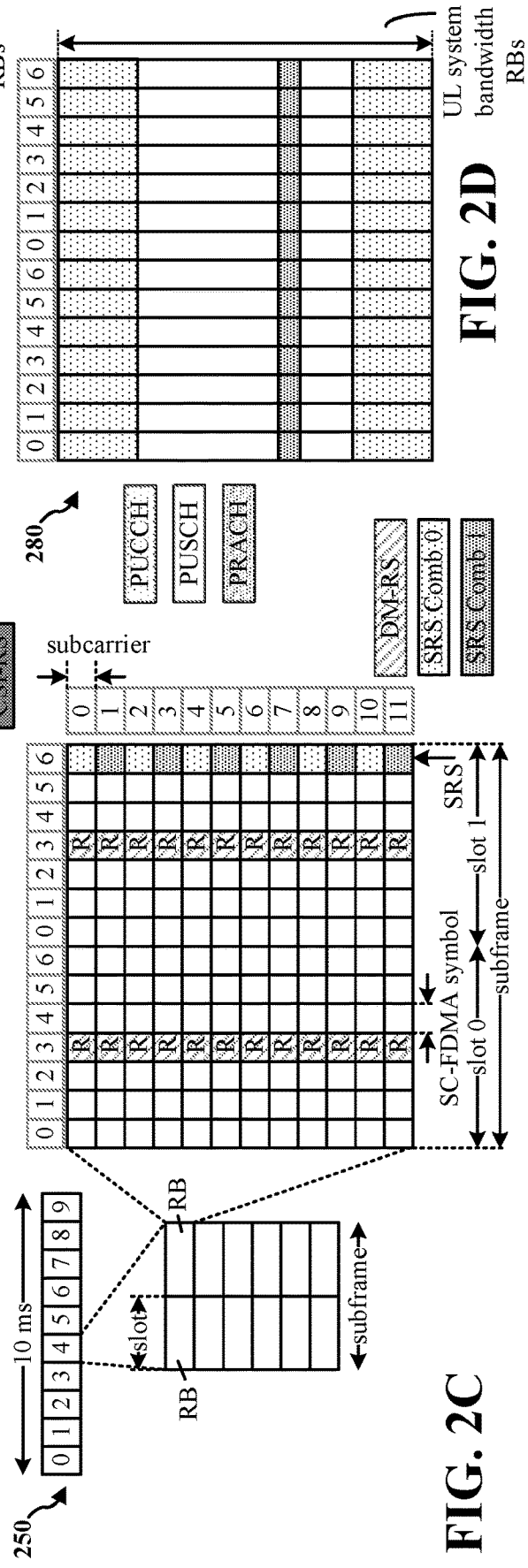

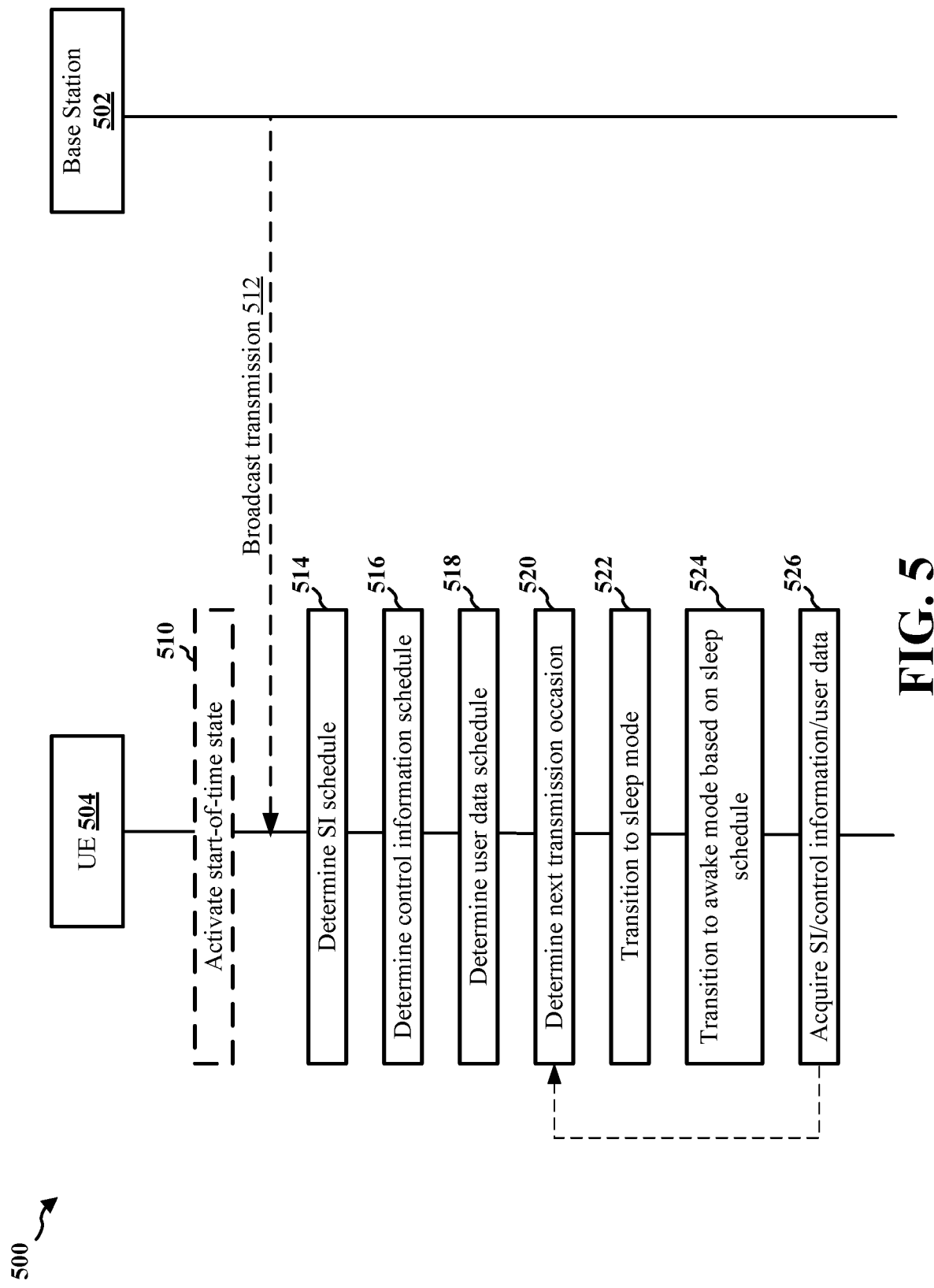

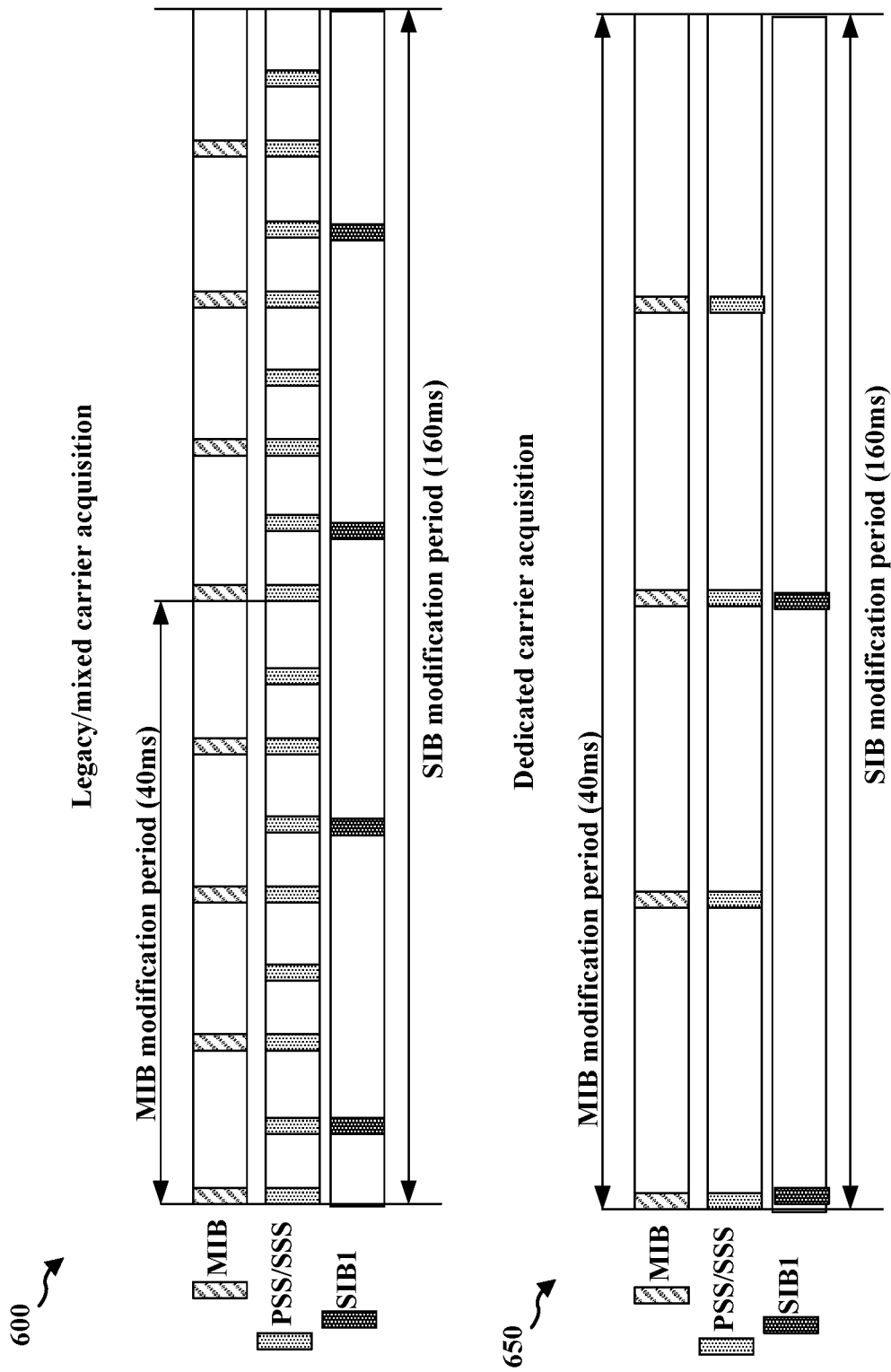

METHODS AND APPARATUS TO
FACILITATE SLEEP MECHANISMS FOR
READ-ONLY MODE DEVICES IN A
DEDICATED CARRIER

CROSS REFERENCE TO RELATED
APPLICATION(S)

This application claims the benefit of U.S. Provisional Application Ser. No. 62/870,502, entitled "METHODS AND APPARATUS TO FACILITATE SLEEP MECHANISMS FOR READ-ONLY MODE DEVICES IN A DEDICATED CARRIER," and filed on Jul. 3, 2019, which is expressly incorporated by reference herein in its entirety.

BACKGROUND

Technical Field

The present disclosure relates generally to communication systems, and more particularly, to sleep mechanisms.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Multimedia broadcast multicast services (MBMS) is a broadcast technology that works over cellular networks. A read-only mode (ROM) device is a device that supports MBMS reception. However, the ROM device may not provide support for unicast connections and may not include uplink capabilities. Accordingly, a ROM device may not be able to exchange signaling with the network and/or may not support paging capabilities.

A sleep mechanism enables a device to conserve battery by entering a sleep mode during which certain components of the device are powered-off or operate in a low power mode. For example, when the device facilitates operating in a discontinuous reception (DRX) mode or extended DRX (eDRX) mode, the device operates sleep cycles during which the device operates in a sleep mode in-between paging occasions. In additional or alternative examples, the device may facilitate operating in a power save mode during which the device may negotiate relatively longer sleep cycles with the network. However, as a ROM device may not support transmitting uplink signals with the network and/or may not support paging capabilities, the ROM device may not be able enter a sleep mode using the DRX/eDRX mode or use techniques in which the ROM device negotiates durations of the sleep cycles.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Sleep mechanisms enable a device to enter a sleep mode to conserve battery. While operating in a sleep mode, the device powers-off certain components of the device and/or operates certain components in a low-power mode. For example, the device may power-off its transmit and/or receive circuits and operate a clock to determine the timing of the next transition to the active mode. ROM devices support MBMS reception, including the receiving of general system information, MBMS control information about a multicast control channel (MCCH), and/or user data on a multicast data channel.

Example techniques disclosed herein enable a ROM device to determine when to transition to an awake mode or a sleep mode. For example, disclosed techniques enable the ROM device to manage its sleep schedule without having to synchronize the sleep schedule with the paging occasions provided by the network. For example, disclosed techniques enable the ROM device to determine a sleep schedule based on, for example, a system information schedule, a MCCH change notification schedule, and/or a user data schedule. The ROM device may then transition to a sleep mode based on the determined sleep schedule and transition to an awake mode based on the sleep schedule. In some examples, the ROM device may determine the sleep schedule based on information received via a broadcast control channel, a multicast control channel, and/or multicast traffic channel.

In an aspect of the disclosure, a method, a computer-readable medium, and an apparatus are provided for wireless communication at a user equipment (UE). An example apparatus triggers a transition to an active mode, from a sleep mode, based on an occurrence of an active mode transitioning trigger event. In some examples, the active mode transitioning trigger event includes at least one of a system information transmission occasion, a control information transmission occasion, or a user data transmission occasion. In some examples, the occurrence of the system information transmission occasion or the control information transmission occasion may occur during a non-Multicast Broadcast Single Frequency Network (MBSFN) subframe of a broadcast carrier, and the occurrence of the user data transmission occasion may occur during a MBSFN subframe of the broadcast carrier. The MBSFN subframe is a cell acquisition subframe (CAS) and the broadcast carrier is a dedicated MBMS carrier.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

FIG. 5 illustrates an example communication flow between a base station and a UE, in accordance with the teachings disclosed herein.

FIG. 6 illustrates examples of system information for mixed carrier acquisition and dedicated carrier acquisition.

DETAILED DESCRIPTION

Figure 1:
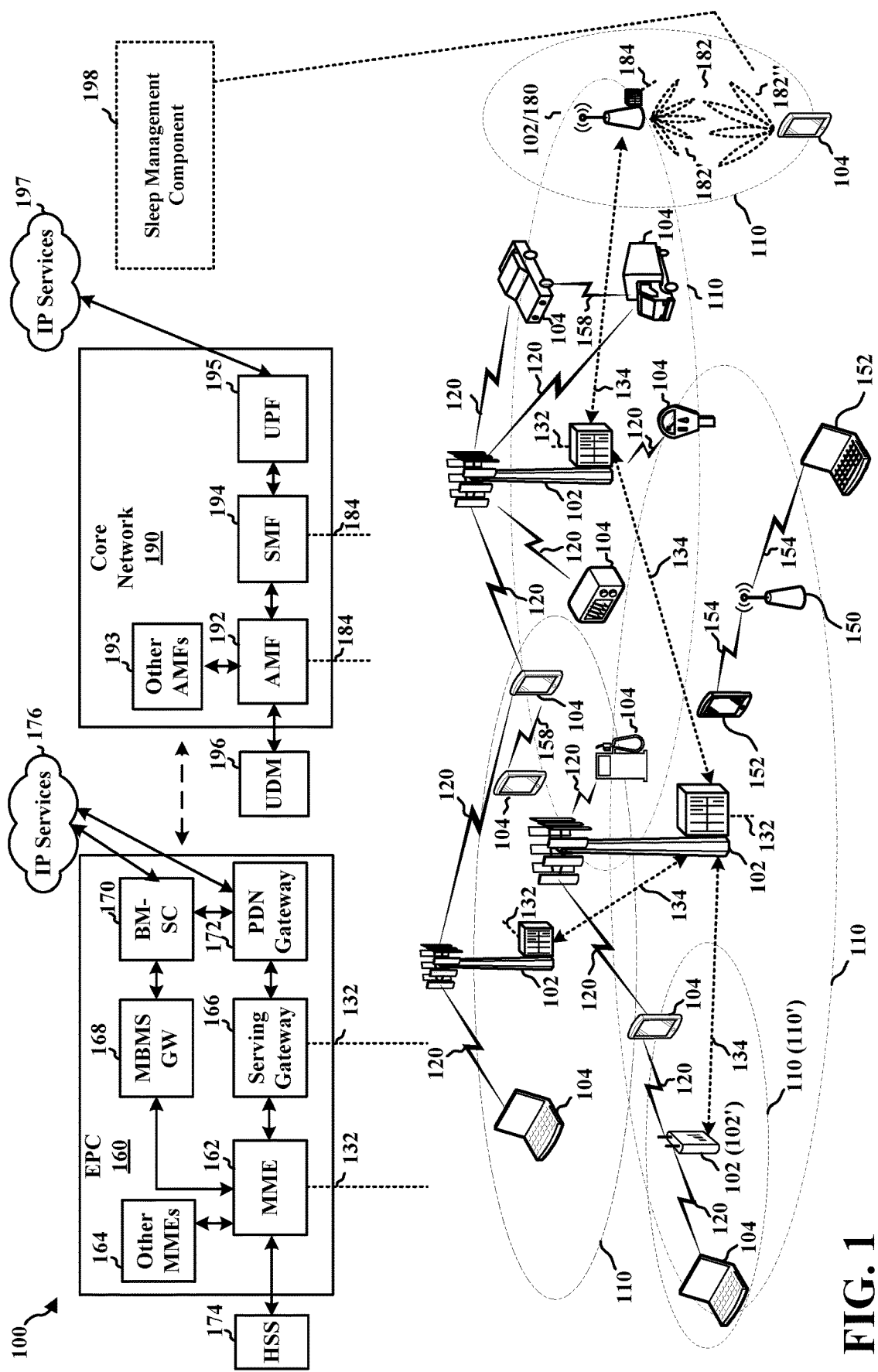
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to manage one or more aspects of wireless communication via managing a sleep mode schedule. As an example, in FIG. 1, the UE 104 may include a sleep management component 198 configured to trigger a transition to an active mode, from a sleep mode, based on an occurrence of an active mode transitioning trigger event. In some examples, the active mode transitioning trigger event includes at least one of a system information transmission occasion, a control information transmission occasion, and a user data transmission occasion. In some examples, the occurrence of the system information transmission occasion or the control information transmission occasion may occur during a cell acquisition subframe region of a broadcast transmission, and the occurrence of the user data transmission occasion may occur during the broadcast transmission.

Although the following description may be focused on LTE, the concepts described herein may be applicable to other similar areas, such as 5G/NR, LTE-A, CDMA, GSM, and/or other wireless technologies, in which a ROM device may transition to a sleep mode, for example, to conserve battery.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by the base station for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

It may be appreciated that one or more aspects of FIGS. 2A to 2D may not applicable to a dedicated MBMS carrier and/or a ROM device. For example, with respect to a dedicated MBMS carrier, in some examples, there may be one antenna port, no CSI-RS, and no PHICH/HARQ. Furthermore, system information and/or control information may be transmitted via cell acquisition subframes (CAS) of the dedicated MBMS carrier while data may be transmitted via the other subframes of the dedicated MBMS carrier.

It may be appreciated that a ROM device may not support uplink capabilities. Accordingly, the transmission of the SRS by the UE (of FIG. 2C) and/or the transmission of various channels within an UL subframe of a frame (of FIG. 2D) may not be applicable to the ROM device.

Figure 3:
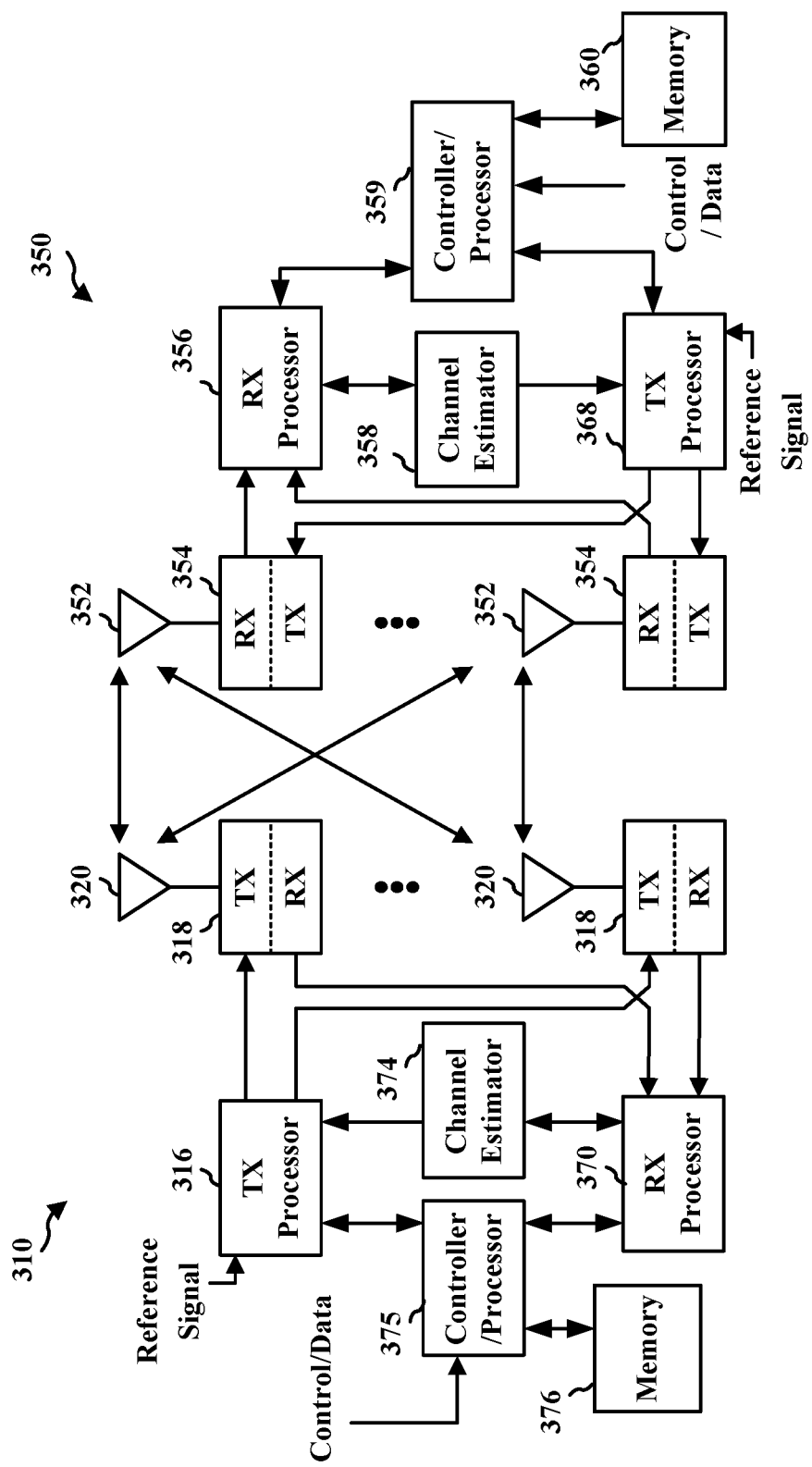
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the sleep management component 198 of FIG. 1.

Figures 4A, 4B, 4C:
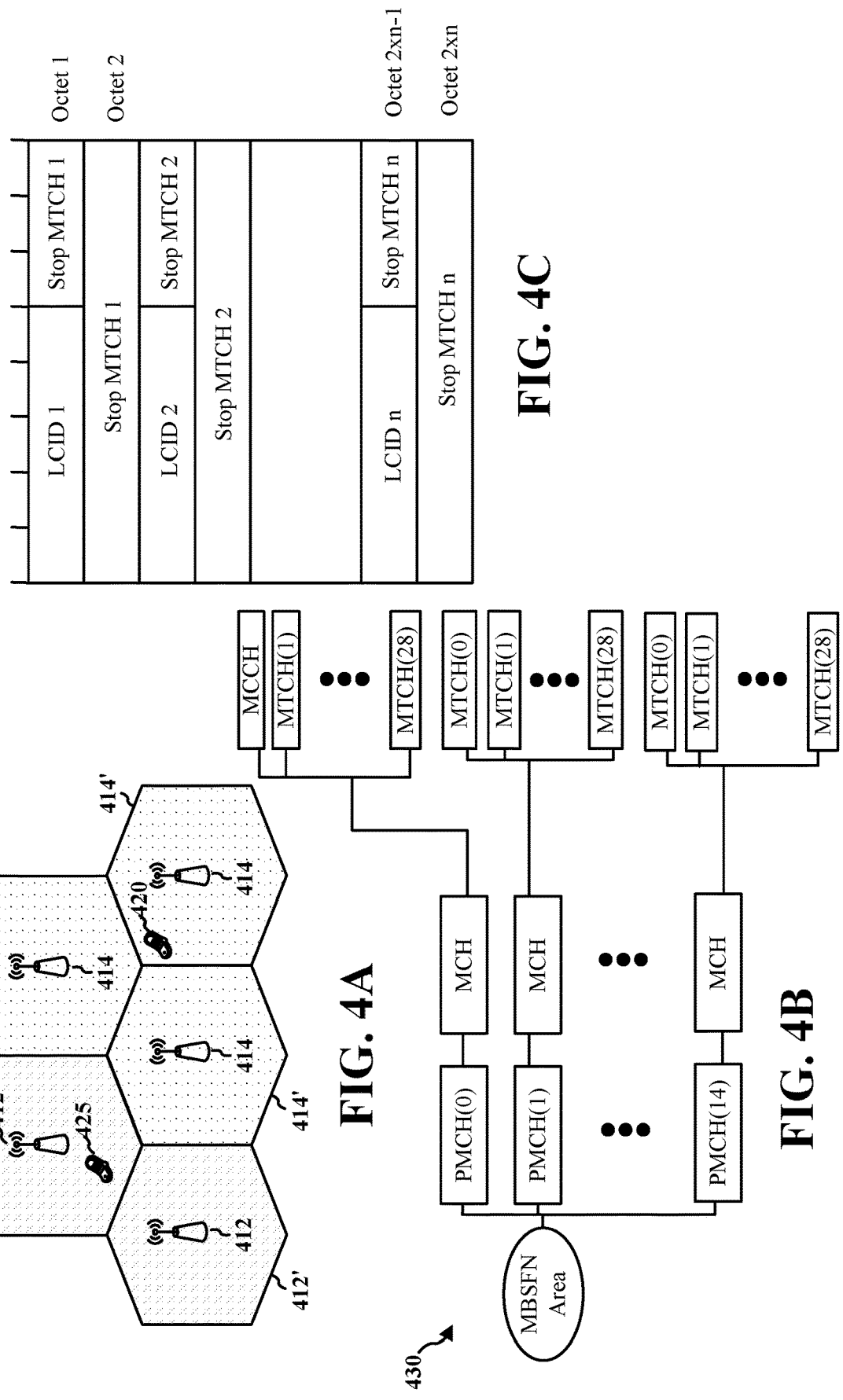
FIG. 4A is a diagram illustrating an example of Multicast Broadcast Single Frequency Network areas in an access network.
FIG. 4B is a diagram illustrating an example of an evolved Multimedia Broadcast Multicast Service channel configuration in a Multicast Broadcast Single Frequency Network.
FIG. 4C is a diagram illustrating a format of a Multicast Channel (MCH) Scheduling Information (MSI) Medium Access Control element.

FIG. 4A is a diagram 410 illustrating an example of MBSFN areas in an access network. The base stations 412 in cells 412' may form a first MBSFN area and the base stations 414 in cells 414' may form a second MBSFN area. The base stations 412, 414 may each be associated with other MBSFN areas, for example, up to a total of eight MBSFN areas. A cell within an MBSFN area may be designated a reserved cell. Reserved cells do not provide multicast/broadcast content, but are time-synchronized to the cells 412', 414' and may have restricted power on MBSFN resources in order to limit interference to the MBSFN areas. Each base station in an MBSFN area synchronously transmits the same eMBMS control information and data. Each MBSFN area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 4A, the first MBSFN area may support a first eMBMS broadcast service, such as by providing a particular news broadcast to UE 425. The second MBSFN area may support a second eMBMS broadcast service, such as by providing a different news broadcast to UE 420.

FIG. 4B is a diagram 430 illustrating an example of an eMBMS channel configuration in an MBSFN. As shown in FIG. 4B, each MBSFN area supports one or more physical multicast channels (PMCH) (e.g., 15 PMCHs). Each PMCH corresponds to an MCH. Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE can camp on an LTE cell to discover the availability of eMBMS service access and a corresponding access stratum configuration. Initially, the UE may acquire a SIB 13 (SIB13). Subsequently, based on the SIB13, the UE may acquire an MBSFN Area Configuration message on an MCCH. Subsequently, based on the MBSFN Area Configuration message, the UE may acquire an MSI MAC control element. The SIB13 may include (1) an MBSFN area identifier of each MBSFN area supported by the cell; (2) information for acquiring the MCCH such as an MCCH repetition period (e.g., 32, 64, ..., 256 frames), an MCCH offset (e.g., 0, 1, ..., 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There is one MBSFN Area Configuration message for each MBSFN area. The MBSFN Area Configuration message may indicate (1) a temporary mobile group identity (TMGI) and an optional session identifier of each MTCH identified by a logical channel identifier within the PMCH, and (2) allocated resources (i.e., radio frames and subframes) for transmitting each PMCH of the MBSFN area and the allocation period (e.g., 4, 8, ..., 256 frames) of the allocated resources for all the PMCHs in the area, and (3) an MCH scheduling period (MSP) (e.g., 8, 16, 32, ..., or 1024 radio frames) over which the MSI MAC control element is transmitted. A particular TMGI identifies a particular service of available MBMSs services.

FIG. 4C is a diagram 440 illustrating the format of an MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There may be one MSI per PMCH per MBSFN area. A logical channel identifier (LCD) field (e.g., LCID 1, LCID 2, . . . , LCID n) may indicate a logical channel identifier of the MTCH. A Stop MTCH field (e.g., Stop MTCH 1, Stop MTCH 2, . . . , Stop MTCH n) may indicate the last subframe carrying the MTCH corresponding to the particular LCID.

A ROM device may be a device that supports MBMS reception. For example, a ROM device may support receiving system information via PBCH, MBMS control information about the MCCH (which may be sent via PDCCH), and/or MBMS data via MTCH (which may be sent via PMCH). ROM devices may also support the reception of synchronization signals and reference signals (pilots). However, ROM devices may not support unicast connections and may not support uplink capability. Accordingly, ROM devices may not exchange signaling with the network and may not support paging capabilities.

An example ROM device may include a television (TV) that receives TV broadcasts via a cellular chip. To support receiving the TV broadcasts, some communication networks utilize a dedicated carrier. In some examples, a dedicated MBMS carrier may not support unicast transmissions while supporting broadcast transmissions. In some examples, transmission of system information and synchronization signals may be performed during reserved cell acquisition subframes (CAS). In certain such examples, CAS may be transmitted periodically (e.g., once every 40 ms). In some examples, a 15 kHz numerology with a 1 ms subframe duration may be used for the CAS. In some examples, subframes that are not CAS of the dedicated MBMS carrier may be dedicated to MBMS transmission. In certain such examples, the non-CAS region may use a different numerology than the CAS region.

Sleep mechanisms enable a device, such as a UE, to conserve battery power by utilizing sleep cycles. For example, while a device is in an idle mode, the device may follow sleep cycles. In some examples, while operating in a sleep mode, the device may transition certain of its devices and/or circuits to a power-off mode and/or a low-power mode. To facilitate the sleep cycles, the network may be aware of the UE status (e.g., whether the UE is awake or asleep). In certain such examples, the network and the UE may implicitly agree on the schedule of the sleep cycles. For example, if the network identifies a page for the UE, the network may wait until a negotiated paging occasion before transmitting the page to the UE.

For example, a UE capable of supporting an (e)DRX mode may operate in the sleep mode in-between paging occasions. In some examples, the timing of the paging occasions may be synchronized between the UE and the network. In some examples, (e)DRX mode may enable the UE to operate in the sleep mode for seconds at a time.

In some examples, a UE may be capable of supporting a power saving mode (PSM). In certain such examples, the UE may negotiate relatively longer sleep durations with the network. For example, the UE may negotiate sleep durations extending over minutes, hours, or days. In certain such examples, the negotiations between the UE and the network may take place during NAS signaling. Example devices that may benefit from supporting PSM may include IoT devices, for example, with limited data transfer capabilities and a relatively long expected battery life.

However, ROM devices that do not facilitate unicast connections (e.g., NAS signaling) and/or may not support paging capabilities, may not be capable of utilizing such DRX or PSM techniques. Aspects presented herein provide techniques for enabling the ROM device to operate in a sleep mode (or low-power mode) and to transition to operation in an awake mode (or active mode). Example techniques disclosed herein enable a ROM device to determine when to transition to an awake mode or a sleep mode. For example, disclosed techniques enable the ROM device to manage its sleep schedule without having to synchronize the sleep schedule with the network. In some examples, control information and user data may be received by the UE via the dedicated carrier according to a schedule. In certain such examples, the ROM device may utilize these characteristics of the control information and the user data to determine and/or manage its sleep cycle.

For example, it may be beneficial for the ROM device to operate in awake mode during the transmission of system information that may be relevant to the ROM device, during the transmission of MCCH transmissions and MCCH change notifications, and during the transmission of user data via MTCH/PMCH. However, during other times, the ROM device may transition to operate in a sleep mode or an idle mode in order to achieve power savings at the ROM device. Accordingly, disclosed techniques enable the ROM device to determine a sleep schedule for itself based on, for example, a system information schedule, a control information schedule (e.g., including MCCH transmissions and/or MCCH change notifications), and/or a user data schedule. The ROM device may then transition to a sleep mode based on the determined sleep schedule and transition to an awake mode based on the sleep schedule.

FIG. 5 illustrates an example wireless communication 500 between a base station 502 and a UE 504, as presented herein. In the illustrated wireless communication 500, the base station 502 may transmit an MBMS service using a dedicated MBMS carrier, and the UE 504 may be a ROM device. One or more aspects of the base station 502 may be implemented by the base station 102/180 of FIG. 1, the base station 310 of FIG. 3, and/or the base stations 412, 414 of FIG. 4. One or more aspects of the UE 504 may be implemented by the UE 104 of FIG. 1, the UE 350 of FIG. 3, and/or the UEs 420, 425 of FIG. 4.

It may be appreciated that while the wireless communication 500 includes one base station 502 in communication with one UE 504, in additional or alternative examples, the base station 502 may be in communication with any suitable quantity of UEs 504 and/or base stations 502, and/or the UE 504 may be in communication with any suitable quantity of base stations 502 and/or UEs 504. Furthermore, the transmissions transmit by the base station 502 of FIG. 5 comprise broadcast transmissions.

At 510, the UE 504 may activate a start-of-time state. The UE 504 may activate the start-of-time state due to, for example, a power-on operation (e.g., the UE 504 being power-on from a power-off state) or the UE 504 detecting a new area. Accordingly, the UE 504 may determine to acquire new schedules associated with transmission occasions that may be useful for determining a new sleep schedule.

The base station 502 may broadcast a broadcast transmission 512. The broadcast transmission 512 may include a CAS region and a non-CAS region. In some examples, the CAS region may include system information and/or multicast control information. In some examples, the non-CAS region includes subframes dedicates to MBMS transmissions. It may be appreciated that the base station 502 may broadcast the broadcast transmission 512 periodically.

At 514, the UE 504 may determine a system information (SI) schedule. For example, the UE 504 may determine the SI schedule and SI via a broadcast control channel (BCCH). The SI schedule may provide the UE 504 a schedule of when to expect SI and, thus, occasions during which the UE 504 is to operate in an awake mode. In some examples, the UE 504 may monitor SIBs on the BCCH. In certain such examples, the SIB schedule may be known. For example, the SIB schedule may be sent via BCCH in the MIB. In some examples, the BCCH may be transmitted during CAS. In certain such examples, the UE 504 may monitor for CAS occasions (e.g., once every 40 ms). However, it may be appreciated that the UE 504 may utilize additional or alternative techniques for monitoring of system information and/or an SI schedule. FIG. 6 illustrates an example 600 of a MIB modification period of 40 ms and a SIB modification period of 160 ms for a mixed carrier acquisition. FIG. 6 also illustrates an example 650 of a MIB modification period and a SIB modification period of 160 ms for a dedicated carrier acquisition.

Figure 7:
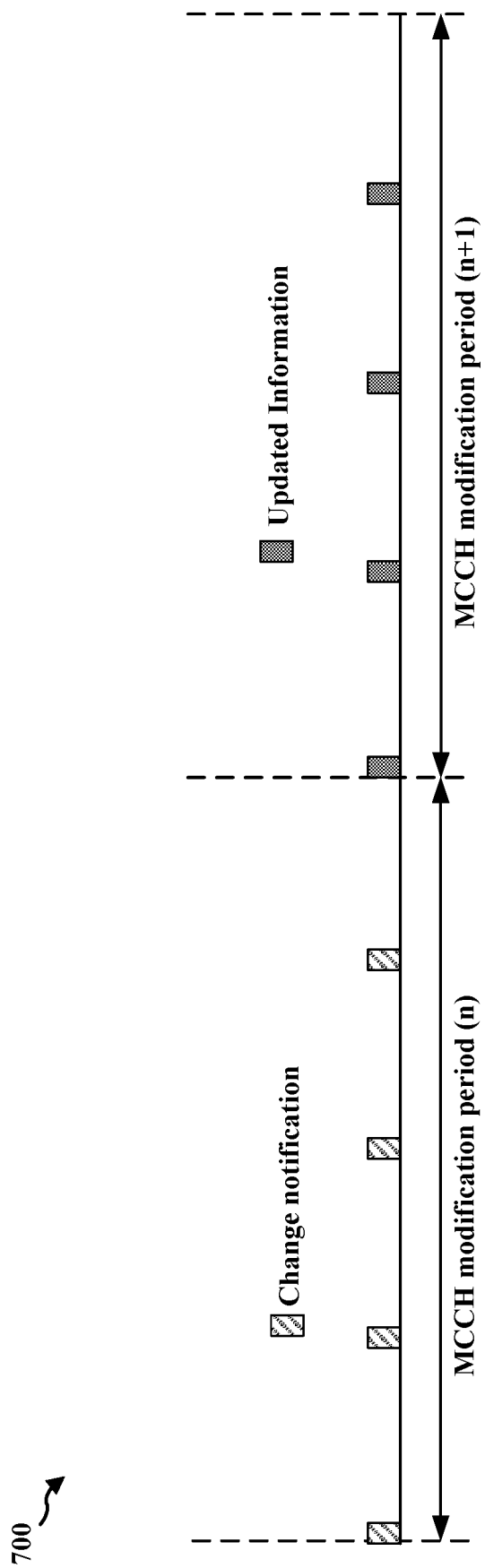
FIG. 7 illustrates example aspects of multicast control channel (MCCH) modification periods.

At 516, the UE 504 may determine a control information schedule. In some examples, multimedia control channel (MCCH) information may be repeated during MCCH occasions in a same modification period. In some examples, MCCH information may change from one modification period to the next modification period. In some examples, MCCH change notifications may be provided during pre-configured MCCH change notification occasions, which may be pre-configured in the system information. FIG. 7 illustrates an example 700 of MCCH change notification occasions in MCCH modification period (n) notifying receivers regarding a change in MCCH information that is provided in MCCH modification period (n+1).

In some examples, when the UE 504 is actively receiving user data, the UE 504 may acquire MCCH information at the start of each MCCH modification period.

In some examples, when the UE 504 enters a new MBSFN area, the UE 504 may acquire MCCH information at the next MCCH repetition.

In some examples, if the UE 504 is not actively receiving user data and is not entering a new MBSFN area, the UE 504 may monitor MCCH change notification occasions. In certain such examples, if the UE 504 detects an MCCH change, the UE 504 may acquire new and/or updated MCCH information at the start of the next MCCH modification period.

In some examples, if the UE 504 incorrectly decodes the MCCH information, the UE 504 may re-try to decode the MCCH information at the next repetition during the MCCH modification period.

It may be appreciated that with respect to the control information schedule, the UE 504 may operate in the sleep mode during other times (e.g., when not acquiring MCCH information at the start of an MCCH modification period, during a pre-configured MCCH change notification occasion, and/or at the next MCCH repetition). Furthermore, as described above, for a dedicated carrier, the MCCH change notification occasions may be transmitted during CAS (e.g., not during the non-CAS region).

At 518, the UE 504 may determine a user data schedule. In some examples, the scheduling of MBMS user data may be performed via MCH scheduling information (MSI) at the MAC layer. For example, when the UE 504 is actively receiving user data, the UE 504 may listen to the MCH channel and receive the schedule of the channels it is interested in (e.g., when packets on those channels will be transmitted). In certain such examples, the UE 504 may determine the user data resources (e.g., the PMCH) via the MCCH and/or the MSI.

It may be appreciated that with respect to the user data schedule, when the UE 504 is not expecting to receive a user data transmission (e.g., based on the user data schedule), the UE 504 may operate in the sleep mode.

At 520, the UE 504 may determine the next transmission occasion (e.g., its sleep schedule). For example, the UE 504 may determine the next transmission occasion based on the system information schedule, the control information schedule, and/or the user data schedule.

At 522, the UE 504 may transition to the sleep mode. For example, the UE 504 may transition one or more components and/or circuits of the UE 504 to a power-off or a low-power mode during the sleep mode.

At 524, the UE 504 may transition to the awake mode based on the sleep schedule. For example, the UE 504 may transition to the awake mode so that the UE 504 is able to receive the next transmission based on the next transmission occasion. In some examples, the next transmission may be a system information transmission based on the system information schedule, may be a control information transmission based on the control information schedule, and/or may be a user data transmission based on the user data schedule.

At 526, the UE 504 may acquire new system information, control information, and/or user data. For example, the UE 504 may acquire system information via the system information transmission, may acquire control information via the control information transmission, and/or may acquire user data via the user data transmission.

In some examples, after the UE 504 acquires the new information, the UE 504 may update its next transmission occasion. For example, if the UE 504 was unable to correctly decode the MCCH information, it may determine the next transmission occasion to correspond to the next MCCH repetition.

However, it may be appreciated that in some examples, the acquired information may be the same as the previous information and/or the next transmission occasion does not need to be updated.

In some examples, the system information schedule may correspond to transmission of system information via the broadcast channel carrying broadcast configuration information. In some examples, the system information schedule may correspond to the CAS.

In some examples, the control information schedule may correspond to determining that the UE 504 enters a new MBSFN area. In certain such examples, the UE 504 may determine the next transmission occasion based on the next first transmission of MCCH information.

In some examples, the control information schedule may correspond to when the UE 504 is actively receiving a broadcast service. In certain such examples, the UE 504 may determine the next transmission occasion based on the transmission of MCCH information at the start of each MCCH modification period.

In some examples, the control information schedule may correspond to MBMS change notifications. In certain such examples, the UE 504 may determine the next transmission occasion based on the change notification schedule and followed by the transmission of the new and/or updated MCCH information at the next MCCH modification period.

In some examples, the user data schedule may correspond to the broadcast service. In certain such examples, the UE 504 may determine the next transmission occasion based on receiving an MBMS or broadcast service.

In this manner, example techniques disclosed herein enable a ROM device to utilize a sleep mechanism and to conserve battery consumption. For example, example techniques disclosed herein enable the ROM device to determine and manage its sleep schedule without having to facilitate a unicast connection and/or support paging capability.

Figure 8:
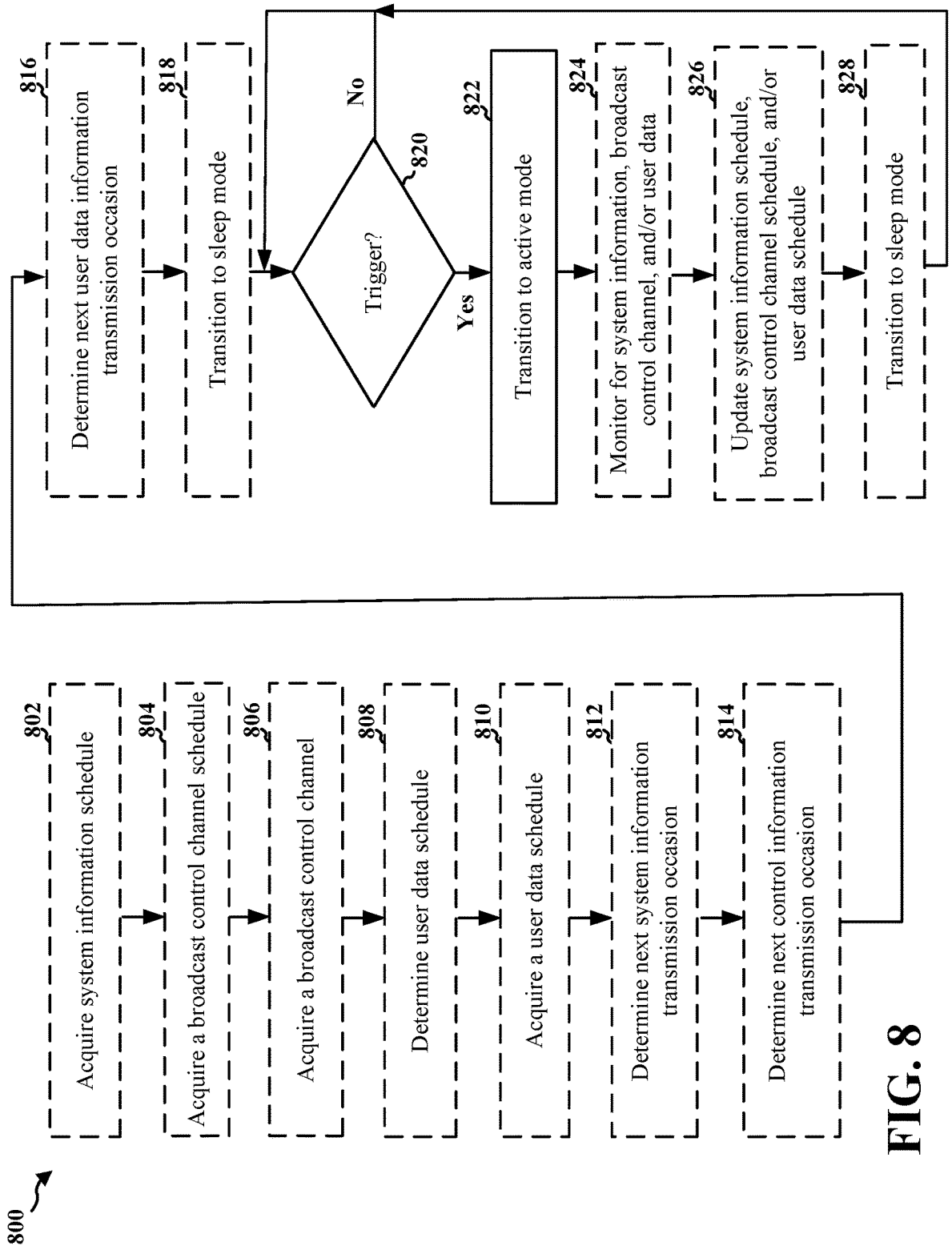
FIG. 8 is a flowchart of a method of wireless communication at a UE, in accordance with the teachings disclosed herein.

FIG. 8 is a flowchart 800 of a method of wireless communication. The method may be performed by a UE or a component of a UE (e.g., the UE 104 of FIG. 1, the UE 350 of FIG. 3, the UEs 420, 425 of FIG. 4, and/or the UE 504 of FIG. 5; the apparatus 902). Optional aspects are illustrated with a dashed line. The UE may be a receive-only mode UE that is not capable of supporting NAS signaling procedures and/or supporting paging. In another example, the UE may merely be operating in a receive-only mode. The method may enable a UE to reduce power consumption by autonomously determining when to transition to a sleep mode and when to transition to an active mode. Although the example aspects are described for the example of transitioning between an active mode and a sleep mode, the aspects may similarly be applied to determining when to transition between an active mode and an idle mode. The UE may make such determinations based on reception of an MBMS service, for example.

At 820, the UE triggers a transition to an active mode from a sleep mode. For example, the UE may determine whether there is a trigger to the active mode from the sleep mode. The trigger may be based on an occurrence of an active mode transitioning trigger, wherein a triggering event comprises at least one of a system information transmission occasion, a control information transmission occasion, or a user data transmission occasion. The trigger of the transition may be performed, e.g., by a trigger component 940 of the apparatus 902 of FIG. 9. As the UE may be a ROM UE, the UE may not be able to receive paging from a base station and/or might not support NAS signaling. The determination at 820 may enable the UE to autonomously transition to a sleep mode and back to an active mode based on schedule information for system information, control information, and/or user data.

The system information transmission occasion may be based on a system information schedule received via a broadcast control channel, and the UE may transition to the active mode to monitor for system information from a base station during the system information transmission occasion. The control information transmission occasion may be based on a change notification schedule received via system information, and the UE may transition to the active mode to monitor for a change notification from a base station during the control information transmission occasion. The control information transmission occasion may be based on a determination that the UE enters a new cell, and the UE may transition to the active mode to monitor for control information from the new cell during the control information transmission occasion. The user data transmission occasion may be based on a user data schedule received via a broadcast control channel, and the UE may transition to the active mode to monitor for user data from a base station during the user data transmission occasion.

When the UE determines the trigger has occurred, the UE transitions to the active mode from the sleep mode, at 822. The transition may be based on the occurrence of the active mode transitioning trigger determined at 820. The occurrence of the system information transmission occasion or the control information transmission occasion may occur during a CAS region of a broadcast transmission. In some examples, the occurrence of the user data transmission occasion may occur during the CAS region and/or a non-CAS region of the broadcast transmission. The transition may be performed, e.g., by an active mode component 942 of the apparatus 902 of FIG. 9.

As illustrated at 824, the UE may monitor for system information, a broadcast control channel, and/or user data while in the active mode. For example, the UE may monitor for a BCCH, an MCCH, and/or a PMCH for an MBMS service upon transitioning to the active mode. The monitoring may be performed, e.g., by any of a system information component 944, a broadcast channel component 946, and/or a user data component 948 of the apparatus 902 of FIG. 9.

As illustrated at 828, the UE may transition back to the sleep mode after the occurrence of the active mode transitioning trigger that triggered the transition to the active mode. Thus, between occurrences, the UE may autonomously transition to a sleep mode. The transition may be performed, e.g., by a sleep mode component 950 of the apparatus 902 of FIG. 9.

As illustrated at 818 the UE may enter the sleep mode, e.g., prior to the trigger at 820 that causes the UE to transition to the awake mode, e.g., at 822. The UE may determine to enter the sleep mode based on system information for a dedicated MBMS carrier, or based on any of the information acquired at or determined at 802-816. The transition to the sleep mode may be performed, e.g., by the sleep mode component 950 of the apparatus 902 of FIG. 9.

For example, at 802, the UE may acquire a system information schedule and system information via a broadcast control channel. The system information scheduled may be acquired, e.g., from a BCCH for an MBMS service. The acquisition may be performed, e.g., by the system information component 944 of the apparatus 902 of FIG. 9.

At 804, the UE may acquire a broadcast control channel schedule and/or a broadcast control channel change notification schedule from the system information. For example, the UE may acquire an MCCH schedule and/or an MCCH change notification schedule for an MBMS service. The acquisition may be performed, e.g., by a broadcast channel schedule component 952 of the apparatus 902 of FIG. 9.

At 806, the UE may acquire the broadcast control channel, e.g., based on the broadcast control channel schedule acquired at 804. The broadcast control channel may comprise an MCCH. The acquisition may be performed, e.g., by the broadcast channel component 946 of the apparatus 902 of FIG. 9.

At 808, the UE may determine user data resources from the broadcast control channel. For example, the MCCH acquired by the UE at 806 may indicate resources for user data, e.g., for an MBMS service. For example, the user data resources may comprise a PMCH for the MBMS service. The determination may be performed, e.g., by a user data resource component 954 of the apparatus 902 of FIG. 9.

At 810, the UE may acquire a user data schedule based on the user data resources. For example, the UE may acquire a user data schedule for the MBMS service based on the PMCH determined at 808. The acquisition may be performed, e.g., by the user data component 948 of the apparatus 902 of FIG. 9.

At 812, the UE may determine a next system information transmission occasion based on the system information. Thus, after acquiring the system information schedule, at 802, the UE may use the system information schedule to determine a next, upcoming system information occasion.

Figure 9:
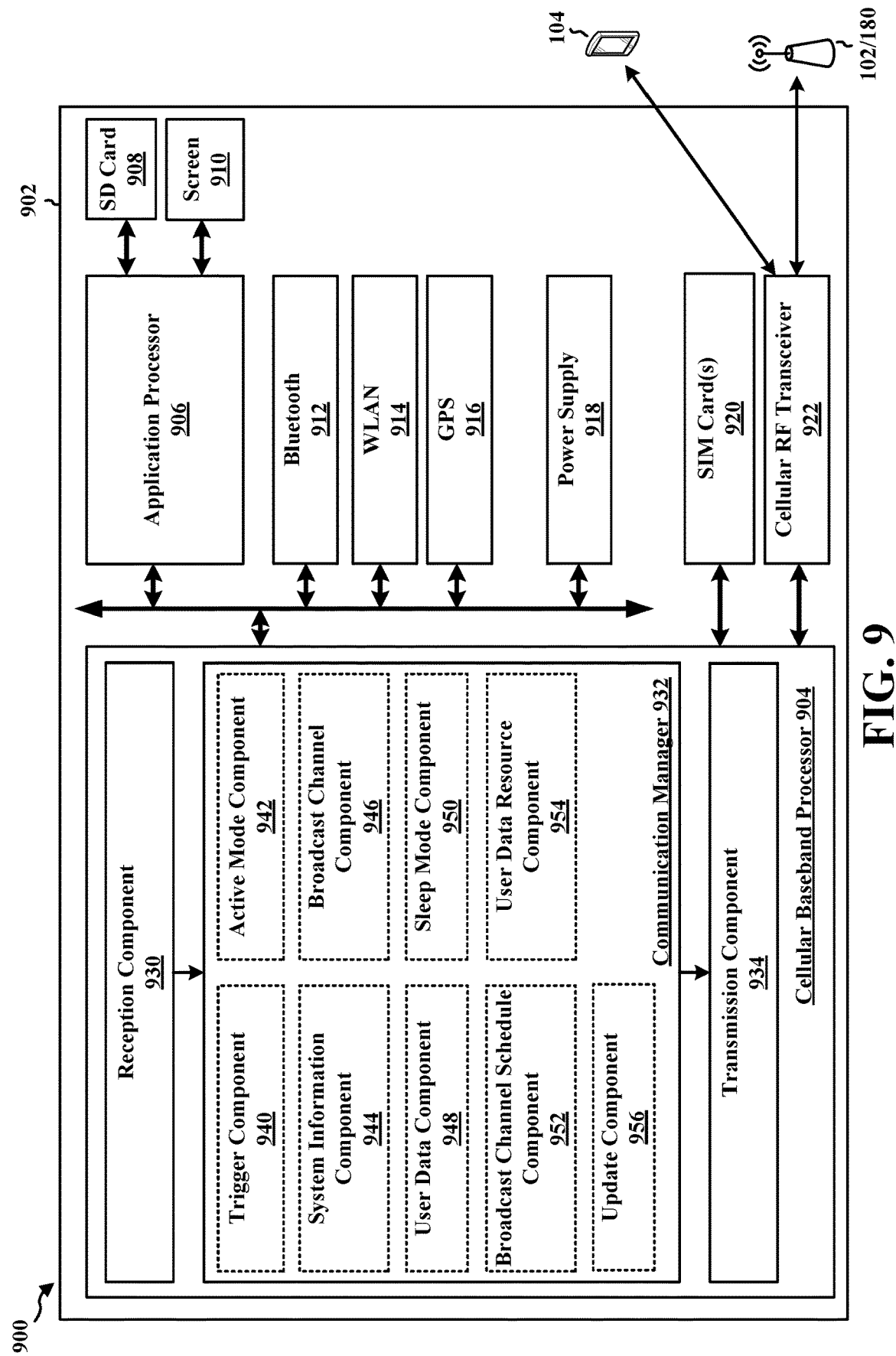
FIG. 9 is a diagram illustrating an example of a hardware implementation for an example apparatus, in accordance with the teachings disclosed herein.

For example, the determination may be performed by the trigger component 940 of the apparatus 902 of FIG. 9.

At 814, the UE may determine a next control information transmission occasion based on the broadcast control channel schedule. Thus, after acquiring the control information transmission schedule, at 804, and/or acquiring the control channel at 806, the UE may use the control information schedule to determine a next, upcoming control information transmission occasion. For example, the determination may be performed by the trigger component 940 of the apparatus 902 of FIG. 9.

At 816, the UE may determine a next user data transmission occasion based on the user data schedule. Thus, after acquiring the control information transmission schedule, at 804, and/or acquiring the control channel at 806, the UE may determine a user data schedule and/or user data resources. The UE may use the user schedule/resources to determine a next, upcoming user data transmission occasion. For example, the determination may be performed by the trigger component 940 of the apparatus 902 of FIG. 9.

The UE may transition to the sleep mode at 818, e.g., based on the next system information transmission occasion determined at 812, the next control information transmission occasion determined at 814, and/or the next user data transmission occasion determined at 816. For example, if the UE is between such occasions, the UE may determine to transition to a sleep mode. The transition to the sleep mode may be performed, e.g., by the sleep mode component 950 of the apparatus 902 of FIG. 9.

The UE may identify a trigger, at 820, and/or transition to the active mode, at 822, based on the next system information transmission occasion, the next control information transmission occasion, and/or the next user data transmission occasion. The identification of the trigger may be performed by the trigger component 940 of the apparatus 902 of FIG. 9.

The UE may update, at 826, at least one of the system information schedule, the broadcast control channel schedule, and/or the user data schedule based on information received while operating in the active mode. The UE may use the updated information to make a new determination of the next system information transmission occasion, the next control information transmission occasion, and/or user data information transmission occasion, such as initially determined at 812, 814, and/or 816. The update may be performed by an update component 956 of the apparatus 902 of FIG. 9.

After receiving the updated information, the UE may transition back to a sleep mode, at 828. The transition to the sleep mode may be performed, e.g., by the sleep mode component 950 of the apparatus 902 of FIG. 9. While in the sleep mode, the UE may determine whether a next system information transmission occasion, the next control information transmission occasion, and/or user data information transmission occasion triggers another transition to an active mode, at 822. The determination may be performed, e.g., by the trigger component 940 of the apparatus 902 of FIG. 9.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or base station 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see the UE 350 of FIG. 3) and include the aforediscussed additional modules of the apparatus 902.

The communication manager 932 includes a trigger component 940 that is configured to facilitate triggering a transition, e.g., as described above in connection with 812, 814, 816, and/or 820 of FIG. 8. The communication manager 932 further includes an active mode component 942 that is configured to facilitate transitioning to an active mode from a sleep mode, e.g., as described above in connection with 822 of FIG. 8. The communication manager 932 further includes a system information component 944 that is configured to facilitate monitoring for system information, e.g., as described above in connection with 802 and/or 824 of FIG. 8. The communication manager 932 further includes a broadcast channel component 946 that is configured to facilitate monitoring for a broadcast control channel, e.g., as described above in connection with 806 and/or 824 of FIG. 8. The communication manager 932 further includes a user data component 948 that is configured to facilitate user data schedule acquisition, e.g., as described above in connection with 810 and/or 824 of FIG. 8. The communication manager 932 further includes a sleep mode component 950 that is configured to facilitate transitioning to sleep mode, e.g., as described above in connection with 818 and/or 828 of FIG. 8. The communication manager 932 further includes a broadcast channel schedule component 952 that is configured to facilitate broadcast channel schedule acquisition, e.g., as described above in connection with 804 of FIG. 8. The communication manager 932 further includes a user data resource component 954 that is configured to facilitate determining user data resources, e.g., as described above in connection with 808 of FIG. 8. The communication manager 932 further includes an update component 956 that is configured to facilitate updating at least one of the system information schedule, the broadcast control channel schedule, and/or the user data schedule, e.g., as described above in connection with 826 of FIG. 8.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for triggering a transition to an active mode, from a sleep mode, based on an occurrence of an active mode transitioning trigger event, wherein the active mode transitioning trigger event comprises at least one of a system information transmission occasion, a control information transmission occasion, or a user data transmission occasion. The apparatus 902 may also include means for transitioning to the active mode, from the sleep mode, based on the occurrence of the active mode transitioning trigger event, wherein the occurrence of the system information transmission occasion or the control information transmission occasion occurs during a CAS region of a broadcast transmission, and wherein the occurrence of the user data transmission occasion occurs during the broadcast transmission. The apparatus 902 may also include means for entering the sleep mode, which may be based on system information for a dedicated MBMS carrier. The apparatus 902 may also include means for transitioning to the sleep mode after the occurrence of the active mode transitioning trigger event that triggered the transition to the active mode. The apparatus 902 may also include means for acquiring a system information schedule and system information via a broadcast control channel. The apparatus 902 may also include means for acquiring a broadcast control channel schedule and a broadcast control channel change notification schedule from the system information. The apparatus 902 may also include means for acquiring the broadcast control channel based on the broadcast control channel. The apparatus 902 may also include means for determining user data resources from the broadcast control channel. The apparatus 902 may also include means for acquiring a user data schedule based on the user data resources. The apparatus 902 may also include means for determining a next system information transmission occasion based on the system information. The apparatus 902 may also include means for determining a next control information transmission occasion based on the broadcast control channel schedule. The apparatus 902 may also include means for determining a next user data transmission occasion based on the user data schedule. The apparatus 902 may also include means for transitioning to the sleep mode based on the next system information transmission occasion, the next control information transmission occasion, and the next user data transmission occasion. The apparatus 902 may also include means for transitioning to the active mode based on the next system information transmission occasion, the next control information transmission occasion, and the next user data transmission occasion. The apparatus 902 may also include means for updating at least one of the system information schedule, the broadcast control channel schedule, and/or the user data schedule based on information received while operating in the active mode. The means for transitioning to the sleep mode may be configured to transition to the sleep mode after updating the system information schedule, the broadcast control channel schedule, and/or the user data schedule.

The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following examples are illustrative only and may be combined with aspects of other embodiments or teachings described herein, without limitation.

Example 1 is a method of wireless communication by a receive-only mode UE, comprising: triggering a transition to an active mode, from a sleep mode, based on an occurrence of an active mode transitioning trigger event, wherein the active mode transitioning trigger event comprises at least one of a system information transmission occasion, a control information transmission occasion, and a user data transmission occasion; and transitioning to the active mode, from the sleep mode, based on the occurrence of the active mode transitioning trigger.

In Example 2, the method of Example 1 further includes that the occurrence of the system information transmission occasion or the control information transmission occasion occurs during a CAS region of a broadcast transmission, and wherein the occurrence of the user data transmission occasion occurs during the broadcast transmission.

In Example 3, the method of any of Example 1 or Example 2 further includes entering the sleep mode, wherein the UE determines to enter the sleep mode based on system information for a dedicated MBMS carrier.

In Example 4, the method of any of Examples 1 to 3 further includes transitioning to the sleep mode after the occurrence of the active mode transitioning trigger event that triggered the transition to the active mode.

In Example 5, the method of any of Examples 1 to 4 further includes that the system information transmission occasion is based on a system information schedule received via a broadcast control channel, and wherein the UE transitions to the active mode to monitor for system information from a base station during the system information transmission occasion.

In Example 6, the method of any of Examples 1 to 5 further includes that the control information transmission occasion is based on a change notification schedule received via system information, and wherein the UE transitions to the active mode to monitor for a change notification from a base station during the control information transmission occasion.

In Example 7, the method of any of Examples 1 to 6 further includes that the control information transmission occasion is based on a determination that the UE enters a new cell, and wherein the UE transitions to the active mode to monitor for control information from the new cell during the control information transmission occasion.

In Example 8, the method of any of Examples 1 to 7 further includes that the user data transmission occasion is based on a user data schedule received via a broadcast control channel, and wherein the UE transitions to the active mode to monitor for user data from a base station during the user data transmission occasion.

In Example 9, the method of any of Examples 1 to 8 further includes: acquiring a system information schedule and system information via a broadcast control channel; acquiring a broadcast control channel schedule and a broadcast control channel change notification schedule from the system information; acquiring the broadcast control channel based on the broadcast control channel schedule; determining user data resources from the broadcast control channel; acquiring a user data schedule based on the user data resources; determining a next system information transmission occasion based on the system information; determining a next control information transmission occasion based on the broadcast control channel schedule; determining a next user data transmission occasion based on the user data schedule; and transitioning to the sleep mode based on the next system information transmission occasion, the next control information transmission occasion, and the next user data transmission occasion.

In Example 10, the method of any of Examples 1 to 9 further includes: transitioning to the active mode based on the next system information transmission occasion, the next control information transmission occasion, and the next user data transmission occasion; updating at least one of the system information schedule, the broadcast control channel schedule, and the user data schedule based on information received while operating in the active mode; and transitioning to the sleep mode.

Example 11 is a device including one or more processors and one or more memories in electronic communication with the one or more processors storing instructions executable by the one or more processors to cause a system or an apparatus to implement a method as in any of Examples 1 to 10.

Example 12 is a system or apparatus including means for implementing a method or realizing an apparatus as in any of Examples 1 to 10.

Example 13 is a non-transitory computer-readable medium storing instructions executable by one or more processors to cause the one or more processors to implement a method as in any of Examples 1 to 10.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), comprising:
    determining a plurality of occasions at which to transition from a sleep mode of the UE to an active mode of the UE based on received schedule information;
    transitioning to the sleep mode from the active mode in response to the determining of the occasions at which to transition from the sleep mode;
    determining a plurality of active mode transitioning trigger events that respectively indicate occurrence of a system information transmission occasion including system information on a physical broadcast channel (PBCH), a control information transmission occasion including multicast control channel (MCCH) information, and a user data transmission occasion including user data on a physical multicast channel (PMCH), as the occasions at which to transition from the sleep mode to the active mode; and
    transitioning to the active mode, from the sleep mode, in response to respective ones of the active mode transitioning trigger events, the UE being a receive-only mode (ROM) device.

2. The method of claim 1, wherein the determining the active mode transitioning trigger events comprises:
    determining the occurrence of the system information transmission occasion or the control information transmission occasion during a non-Multicast Broadcast Single Frequency Network (MBSFN) subframe of a broadcast carrier, and
    determining the occurrence of the user data transmission occasion occurs during an MBSFN subframe of the broadcast carrier.

3. The method of claim 2, wherein the MBSFN subframe is a cell acquisition subframe (CAS) and the broadcast carrier is a dedicated multimedia broadcast multicast service (MBMS) carrier.

4. The method of claim 1, further comprising transitioning to the sleep mode based on the system information for a dedicated multimedia broadcast multicast service (MBMS) carrier.

5. The method of claim 1, further comprising transitioning to the sleep mode after an occurrence of a respective one of the active mode transitioning trigger events that triggered the transitioning to the active mode.

6. The method of claim 1, further comprising:
receiving a system information schedule via a broadcast control channel, wherein the determining the active mode transitioning trigger events comprises determining the occurrence of the system information transmission occasion based on the system information schedule; and
monitoring for, in the active mode, the system information from a base station during the system information transmission occasion.

7. The method of claim 1, further comprising:
receiving a MCCH change notification schedule via the system information; and
monitoring for, in the active mode, a change notification from a base station during the control information transmission occasion.

8. The method of claim 1, wherein the determining the active mode transitioning trigger events comprises:
determining that the UE is entering a new cell, and
determining the occurrence of the control information transmission occasion based on the determining that the UE is entering the new cell,
further comprising monitoring for, in the active mode, the MCCH information from the new cell during the control information transmission occasion.

9. The method of claim 1, further comprising:
receiving a user data schedule via a broadcast control channel; and
monitoring for, in the active mode, the user data from a base station during the user data transmission occasion.

10. The method of claim 1, further comprising:
acquiring a system information schedule and the system information via a broadcast control channel;
acquiring a broadcast control channel schedule and a broadcast control channel change notification schedule from the system information;
acquiring the broadcast control channel based on the broadcast control channel schedule;
determining user data resources from the broadcast control channel; and
acquiring a user data schedule based on the user data resources,
wherein the determining the occasions at which to transition from the sleep mode to the active mode comprises:
determining a next system information transmission occasion based on the system information,
determining a next control information transmission occasion based on the broadcast control channel schedule, and
determining a next user data transmission occasion based on the user data schedule,
wherein the transitioning to the sleep mode from the active mode is based on the next system information transmission occasion, the next control information transmission occasion, and the next user data transmission occasion.

11. The method of claim 10, wherein the transitioning to the active mode from the sleep mode is based on the next system information transmission occasion, the next control information transmission occasion, and the next user data transmission occasion, and further comprising:
updating at least one of the system information schedule, the broadcast control channel schedule, and the user data schedule based on information received while operating in the active mode; and
transitioning to the sleep mode.

12. An apparatus for wireless communication by a user equipment (UE), comprising:
a transceiver;
at least one processor; and
a memory coupled to the at least one processor and to the transceiver, storing instructions thereon, which when executed by the at least one processor, causes the apparatus to:
determine a plurality of occasions at which to transition from a sleep mode of the UE to an active mode of the UE based on received schedule information;
transition to the sleep mode from the active mode in response to the determining of the occasions at which to transition from the sleep mode to the active mode;
determine a plurality of active mode transitioning trigger events that respectively indicate occurrence of a system information transmission occasion including system information on a physical broadcast channel (PBCH), a control information transmission occasion including multicast control channel (MCCH) information, and a user data transmission occasion including user data on a physical multicast channel (PMCH), as the occasions at which to transition from the sleep mode to the active mode; and
transition to the active mode, from the sleep mode, in response to respective ones of the active mode transitioning trigger events, the UE being a receive-only mode (ROM) device.

13. The apparatus of claim 12, wherein the instructions executed by the at least one processor that cause the apparatus to determine the active mode transitioning trigger events further cause the apparatus to:
determine the occurrence of the system information transmission occasion or the control information transmission occasion during a non-Multicast Broadcast Single Frequency Network (MBSFN) subframe of a broadcast carrier, and
determine the occurrence of the user data transmission occasion occurs during an MBSFN subframe of the broadcast carrier.

14. The apparatus of claim 13, wherein the MBSFN subframe is a cell acquisition subframe (CAS) and the broadcast carrier is a dedicated multimedia broadcast multicast service (MBMS) carrier.

15. The apparatus of claim 12, wherein the at least one processor is further configured to transition to the sleep mode based on the system information for a dedicated multimedia broadcast multicast service (MBMS) carrier.

16. The apparatus of claim 12, wherein the at least one processor is further configured to transition to the sleep mode after an occurrence of a respective one of the active mode transitioning trigger events that triggered the transition to the active mode.

17. The apparatus of claim 12, wherein the instructions executed by the at least one processor further cause the apparatus to receive a system information schedule via a broadcast control channel, wherein the instructions executed by the at least one processor that cause the apparatus to determine the active mode transitioning trigger events further cause the apparatus to determine the occurrence of the system information transmission occasion based on the system information schedule, and wherein the instructions executed by the at least one processor further cause the apparatus to monitor for, in the active mode, the system information from a base station during the system information transmission occasion.

18. The apparatus of claim 12, wherein the instructions executed by the at least one processor further cause the apparatus to receive a change notification schedule via the system information, wherein the instructions executed by the at least one processor that cause the apparatus to determine the active mode transitioning trigger events further cause the apparatus to determine the occurrence of the control information transmission occasion based on the change notification schedule, and wherein the instructions executed by the at least one processor further cause the apparatus to monitor for, in the active mode, a change notification from a base station during the control information transmission occasion.

19. The apparatus of claim 12, wherein the instructions executed by the at least one processor that cause the apparatus to determine the active mode transitioning trigger events further cause the apparatus to:
 determine that the UE is entering a new cell, and
 determine the occurrence of the control information transmission occasion based on determination that the UE enters the new cell,
 wherein the instructions executed by the at least one processor further cause the apparatus to monitor for, in the active mode, the MCCH information from the new cell during the control information transmission occasion.

20. The apparatus of claim 12, wherein the instructions executed by the at least one processor further cause the apparatus to receive a user data schedule via a broadcast control channel, wherein the instructions executed by the at least one processor that cause the apparatus to determine the active mode transitioning trigger events further cause the apparatus to determine the occurrence of the user data transmission occasion based on the user data schedule, and wherein the instructions executed by the at least one processor further cause the apparatus to monitor for, in the active mode, the user data from a base station during the user data transmission occasion.

21. The apparatus of claim 12, wherein the instructions executed by the at least one processor further cause the apparatus to:
 acquire a system information schedule and the system information via a broadcast control channel;
 acquire a broadcast control channel schedule and a broadcast control channel change notification schedule from the system information;
 acquire the broadcast control channel based on the broadcast control channel;
 determine user data resources from the broadcast control channel schedule; and
 acquire a user data schedule based on the user data resources,
 wherein the instructions executed by the at least one processor that cause the apparatus to determine the active mode transitioning trigger events further cause the apparatus to:
  determine a next system information transmission occasion based on the system information,
  determine a next control information transmission occasion based on the broadcast control channel schedule, and
  determine a next user data transmission occasion based on the user data schedule,
 wherein the instructions executed by the at least one processor that cause the apparatus to transition to the sleep mode is based on the next system information transmission occasion, the next control information transmission occasion, and the next user data transmission occasion.

22. The apparatus of claim 21, wherein the instructions executed by the at least one processor cause the apparatus to transition to the active mode based on the next system information transmission occasion, the next control information transmission occasion, and the next user data transmission occasion, wherein the instructions executed by the at least one processor further cause the apparatus to:
 update at least one of the system information schedule, the broadcast control channel schedule, and the user data schedule based on information received while operating in the active mode; and
 transition to the sleep mode.

23. An apparatus for wireless communication by a user equipment (UE), comprising:
 means for determining a plurality of occasions at which to transition from a sleep mode of the UE to an active mode of the UE based on received schedule information;
 means for transitioning to the sleep mode from the active mode in response to the determining of the occasions at which to transition from the sleep mode to the active mode;
 means for determining a plurality of active mode transitioning trigger events that respectively indicate occurrence of a system information transmission occasion including system information on a physical broadcast channel (PBCH), a control information transmission occasion including multicast control channel (MCCH) information, and a user data transmission occasion including user data on a physical multicast channel (PMCH), as the occasions at which to transition from the sleep mode to the active mode; and
 means for transitioning to the active mode, from the sleep mode, in response to respective ones of the active mode transitioning trigger events, the UE being a receive-only mode (ROM) device.

24. The apparatus of claim 23, wherein the means for determining the active mode transitioning trigger events is further configured to:
 determine an occurrence of the system information transmission occasion or the control information transmission occasion during a cell acquisition subframe (CAS) region of a broadcast transmission, and
 determine the occurrence of the user data transmission occasion during the broadcast transmission.

25. The apparatus of claim 23, further comprising:
 means for transitioning to the sleep mode based on the system information for a dedicated multimedia broadcast multicast service (MBMS) carrier.

26. The apparatus of claim 23, further comprising:
 means for transitioning to the sleep mode after an occurrence of a respective one of the active mode transitioning trigger events that triggered the transitioning to the active mode.

27. The apparatus of claim 23, further comprising:
 means for receiving a system information schedule via a broadcast control channel, wherein the means for determining the active mode transitioning trigger events is further configured to determine the occurrence of the system information transmission occasion based on the system information schedule; and
 means for monitoring for the system information from a base station during the system information transmission occasion.

28. The apparatus of claim 23, further comprising:
means for receiving a change notification schedule via the system information; and
means for monitoring for, in the active mode, a change notification from a base station during the control information transmission occasion.

29. The apparatus of claim 23, wherein means for determining the active mode transitioning trigger events is further configured to:
determine that the UE is entering a new cell, and
determine the occurrence of the control information transmission occasion based on the determination that the UE is entering the new cell,
further comprising means for monitoring for, in the active mode, the MCCH information from the new cell during the control information transmission occasion.

30. The apparatus of claim 23, further comprising:
means for receiving a user data schedule via a broadcast control channel; and
means for monitoring for, in the active mode, the user data from a base station during the user data transmission occasion.

31. The apparatus of claim 23, further comprising:
means for acquiring a system information schedule and the system information via a broadcast control channel;
means for acquiring a broadcast control channel schedule and a broadcast control channel change notification schedule from the system information;
means for acquiring the broadcast control channel based on the broadcast control channel;
means for determining user data resources from the broadcast control channel schedule; and
means for acquiring a user data schedule based on the user data resources,
wherein the means for determining the occasions at which to transition from a sleep mode to an active mode is further configured to:
determine a next system information transmission occasion based on the system information,
determine a next control information transmission occasion based on the broadcast control channel schedule, and
determine a next user data transmission occasion based on the user data schedule,
wherein the means for transitioning to the sleep mode from the active mode is based on the next system information transmission occasion, the next control information transmission occasion, and the next user data transmission occasion.

32. The apparatus of claim 31, wherein the means for transitioning to the active mode from the sleep mode is based on the next system information transmission occasion, the next control information transmission occasion, and the next user data transmission occasion, and further comprising:
means for updating at least one of the system information schedule, the broadcast control channel schedule, and the user data schedule based on information received while operating in the active mode; and
means for transitioning to the sleep mode.

33. A non-transitory computer-readable medium for wireless communication, storing code thereon, which when executed by at least one processor, the code causing an apparatus to:
determine a plurality of occasions at which to transition from a sleep mode of a user equipment (UE) to an active mode of the UE based on received schedule information;
transition to the sleep mode from the active mode in response to determination of the occasions at which to transition from the sleep mode;
determine a plurality of active mode transitioning trigger events that respectively indicate occurrence of a system information transmission occasion including system information on a physical broadcast channel (PBCH), a control information transmission occasion including multicast control channel (MCCH) information, and a user data transmission occasion including user data on a physical multicast channel (PMCH), as the occasions at which to transition from the sleep mode to the active mode; and
transition to the active mode, from the sleep mode, in response to respective ones of the active mode transitioning trigger events, the UE being a receive-only mode (ROM) device.

\* \* \* \* \*